United States Patent
Wang (10) Patent No.: US 7,600,429 B2
(45) Date of Patent: Oct. 13, 2009

(54) VIBRATION SPECTRUM SENSOR ARRAY HAVING DIFFERING SENSORS

(75) Inventor: Li-Peng Wang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 207 days.

(21) Appl. No.: 11/407,640

(22) Filed: Apr. 20, 2006

(65) Prior Publication Data

US 2007/0245827 A1 Oct. 25, 2007

(51) Int. Cl.
G01D 21/00 (2006.01)
(52) U.S. Cl. ....................................... 73/651
(58) Field of Classification Search ............... 73/651
See application file for complete search history.

(56) References Cited

U.S. PATENT DOCUMENTS

| | | | | |
|---|---|---|---|---|
| 3,745,384 | A * | 7/1973 | Blanchard | 310/324 |
| 4,344,328 | A * | 8/1982 | Hawkins | 73/651 |
| 5,001,933 | A | 3/1991 | Brand | |
| 5,089,695 | A * | 2/1992 | Willson et al. | 250/227.21 |
| 5,610,337 | A | 3/1997 | Nelson | |
| 5,856,722 | A | 1/1999 | Haronian et al. | |
| 6,079,274 | A | 6/2000 | Ando et al. | |
| 6,223,601 | B1 | 5/2001 | Harada et al. | |
| 6,327,909 | B1 | 12/2001 | Hung et al. | |
| 6,374,677 | B1 | 4/2002 | Berlin et al. | |
| 6,402,968 | B1 | 6/2002 | Yazdi et al. | |
| 6,408,496 | B1 * | 6/2002 | Maynard | 29/25.35 |
| 6,438,243 | B1 * | 8/2002 | Ikeuchi et al. | 381/191 |
| 6,484,109 | B1 | 11/2002 | Lofall | |
| 7,092,539 | B2 | 8/2006 | Sheplak et al. | |
| 2003/0005872 | A1 | 1/2003 | DePoy, II | |
| 2006/0049497 | A1 * | 3/2006 | Ohta | 257/678 |
| 2006/0097331 | A1 * | 5/2006 | Hattori et al. | 257/414 |

FOREIGN PATENT DOCUMENTS

EP 0 959 333 A2 11/1999

OTHER PUBLICATIONS

Kunz, K. et al., "Highly Sensitive Triaxial Silicon Accelerometer with Integrated PZT Thin Film Detectors," Elsevier Science B.V., (2001), pp. 156-160.
Zou, Q. et al., "Highly Symmetric Tri-axis Piezoelectric Bimorph Accelerometer," IEEE, (2004), pp. 197-200.
Wang et al., "Silicon Micromachined Ultra-Sensitive Vibration Spectrum Sensor Array (VSSA)," U.S. Appl. No. 11/097,059, filed Mar. 31, 2005.

(Continued)

*Primary Examiner*—Hezron Williams
*Assistant Examiner*—Nashmiya S Fayyaz
(74) *Attorney, Agent, or Firm*—Blakely, Sokoloff, Taylor & Zafman LLP (57) ABSTRACT

According to embodiments of the present invention, vibration sensor array includes at least two microelectromechanical systems (MEMS) vibration sensors formed on a substrate. The vibration element of the first vibration sensor is a different type than the vibration element of the second vibration sensor. For example, the at least two different vibration elements may be selected from a cantilever beam, a bridge beam, a membrane, and/or an annular diaphragm.

11 Claims, 6 Drawing Sheets

OTHER PUBLICATIONS

PCT/US2006/012602, International Search Report and Written Opinion, dated Aug. 31, 2006.
PCT/US2006/012602, International Preliminary Report on Patentability and Written Opinion, dated Oct. 3, 2007.
Office Action mail date Nov. 13, 2006, U.S. Appl. No. 11/097,059, filed Mar. 31, 2005.
Office Action mail date May 8, 2007, U.S. Appl. No. 11/097,059, filed Mar. 31, 2005.
Office Action mail date Sep. 25, 2007, U.S. Appl. No. 11/097,059, filed Mar.31, 2005.
Office Action mail date Jan. 7, 2009, U.S. Appl. No. 11/097,059, filed Mar. 31, 2005.
Office Action receipt Dec. 7, 2007, Taiwanese Application No. 95111207, filed Mar. 30, 2006.
Office Action receipt Nov. 7, 2008, Taiwanese Application No. 95111207, filed Mar. 30, 2006.
Model 793L datasheet (bulk ceramic accelerometers), Wilcoxon Research, Inc., 1999.
ADXL 105 datasheet (MEMS capacitive accelerometers), Analog Devices Inc., 1999.
J. Bernstein, et al., "Low-Noise MEMS Vibration Sensor for Geophysical Applications," Journal of Microelectromechanical Systems, vol. 8, No. 4, pp. 433-438, Dec. 1999.
J. Chae et al., "An In-Plane High-Sensitivity, Low-Noise Micro-g Silicon Accelerometer With CMOS Readout Circuitry," Journal of Microelectromechanical Systems, vol. 13, No. 4, pp. 628-635, Aug. 2004.
S. Timoshenko, "Vibration Problems In Engineering", Second Edition — Fifth Printing; D. Van Nostrand Company, Inc.; pp.iii — ix, and pp. 1-470.

* cited by examiner

VIBRATION SPECTRUM SENSOR ARRAY HAVING DIFFERING SENSORS

BACKGROUND

1. Field

Embodiments of the present invention relate to vibration sensors and in particular, vibration sensors using microelectromechanical systems (MEMS).

2. Discussion of Related Art

Vibration sensors are commonly used for monitoring the vibrations of structures such as buildings and bridges, vehicles such as ships, airplanes, autos and trains, and tools and machinery in factories. Many applications, particularly high-precision tools and machinery, require real-time monitoring to detect any abnormal vibration, because excess vibration in a tool's or machine's environment can cause the tool or machine to malfunction, and certain vibrations originating from the tools or machines themselves serve as indications that maintenance is needed. Therefore, accurate in-line monitoring could significantly reduce the down time and associated cost.

Mechanical vibrations in a structure, vehicle, tool or machine can occur over a wide range of intensities and frequencies, depending on the details of construction and operation. Available state-of-the-art vibration sensors, however, have features that make them unsuitable for use over a wide range of applications. On one hand, highly sensitive vibration sensors with low noise floors (i.e., the minimum vibration intensity the sensor can detect) are large in size, making them difficult to use for applications requiring a small form factor and light weight, such as monitoring robotic arms. They are also prohibitively expensive for applications that require a large number of sensors, such as increasingly important large-scale sensor network applications. On the other hand, very small, lightweight sensors such as microelectromechanical systems (MEMS) based sensors are not sensitive enough at low frequency ranges.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF EMBODIMENTS

Figure 1:
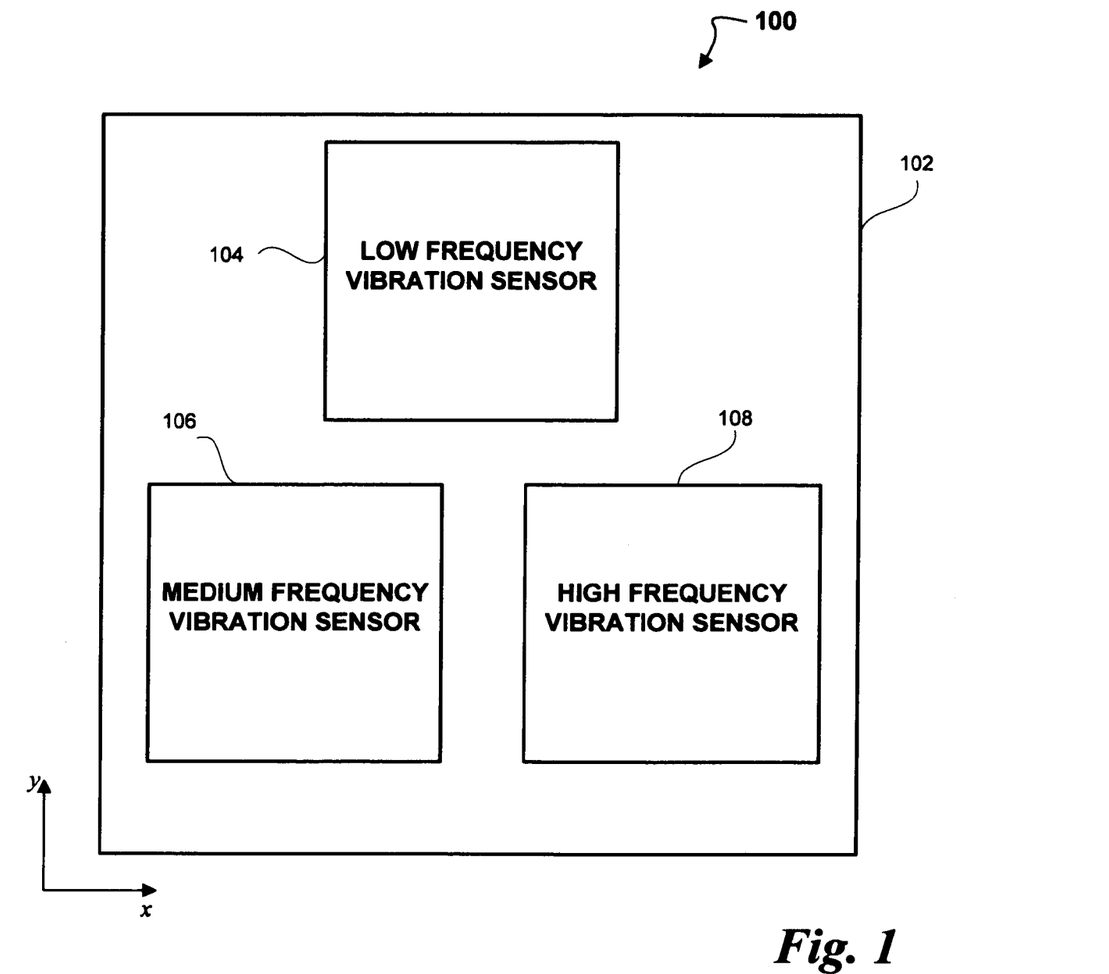
FIG. 1 is a plan view of a sensor array including several different types of microelectromechanical (MEMS) vibration sensors according to an embodiment of the present invention.

FIG. 1 illustrates an embodiment of the invention comprising a vibration sensor array 100. The vibration sensor array 100 includes a substrate 102 on which three microelectromechanical system (MEMS) vibration sensors are formed. For example, in the illustrated embodiment a vibration sensor 104 may be one type of vibration sensor, a vibration sensor 106 may be a second type of vibration sensor, and a vibration sensor 108 may be a third type of vibration sensor, each of which is formed on the substrate 102.

For some embodiments, the substrate 102 provides a base upon which the vibration sensors 104, 106, and 108 may be built, and can be any substrate in which MEMS devices may be built. In one embodiment the substrate 102 is made of silicon, although in other embodiments the substrate can be made of other materials such as silicon compounds, combinations of silicon and other materials, or other materials altogether. Moreover, although the substrate 102 is shown in the figure as a monolithic substrate made up of a single material, in other embodiments the substrate may be a composite substrate made up of layers of different materials such as dielectrics, conductors and semiconductors. For some embodiments, the thickness of the vibration sensor array 100 is the same for the vibration sensors 104, 106, and 108 may be the same, but may be different.

The types of vibration sensors formed on the substrate 102 may include one or more cantilever vibration elements, clamp-clamp beam vibration elements, bridge beam vibration elements, annular diaphragm vibration elements, membrane vibration elements, and/or suspension vibration elements. As a result, the vibration sensor array 100 may include any combination of two or more of the above-described vibration elements. For example, the vibration sensor array 100 may have a cantilever-based low-frequency frequency vibration sensor 104, a clamp-clamp beam-based medium frequency vibration sensor 106, and an annular diaphragm-based high-frequency vibration sensor 108 all formed on the same substrate 102.

Figure 2:
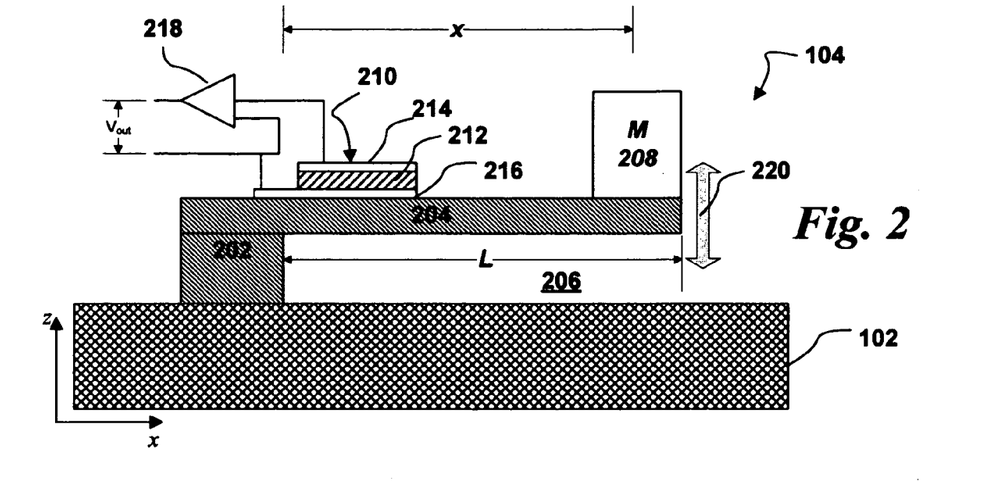
FIG. 2 is a cross-section view of a cantilever-based vibration sensor that may be formed on the substrate depicted in FIG. 1 according to an embodiment of the present invention.

FIG. 2 illustrates an example of the low-frequency vibration sensor 104 implemented as a cantilever-based vibration sensor according to an embodiment of the present invention. The vibration sensor 104, like the other embodiments of vibration sensors discussed herein, can be manufactured using techniques known in the art, such as silicon micromachining and depositing, patterning, and etching of materials.

In the vibration sensor 104, the vibrating element is a cantilever beam 204 attached to the substrate 102 by an anchor 202. The anchor 202 serves both to attach the cantilever beam 204 to the substrate 102 and to suspend the cantilever beam 204 above the substrate 102 such that there is an air gap 206 between the cantilever beam 204 and the substrate 102. The air gap 206 permits the cantilever beam 204 to vibrate in the direction indicated by the arrows 220. In one embodiment, the anchor 202 and the cantilever beam 204 are a single unit made of the same material, such as polysilicon, silicon nitride (SiN), single crystal silicon, and the like. In other embodiments, the anchor 202 and cantilever beam 204 can be separate units made of the same material or separate units made of different materials, and the materials can be materials besides those listed.

In the illustrated embodiment, a mass 208 of magnitude M is formed on the cantilever beam 204 at a distance x from the anchor 202. In other embodiments, however, the mass 208 can be omitted completely. For embodiments that include the mass 208, the mass 208 may be made of a dense material such as gold (Au), silver (Ag), platinum (Pt), or another material not listed here.

The magnitude M of the mass 208, along with its position x along the beam 204 and the length L and cross section of the cantilever beam 204 can be varied to tailor the noise floor and operational frequency range of the vibration sensor 200. The fundamental lower limit for noise floor corresponds to Brownian motion and is given by:

$$a_n = \sqrt{\frac{4k_B T \omega_0}{MQ}},$$

where $a_n$ is the theoretical noise floor (also known as the equivalent noise acceleration), $k_B$ is Boltzmann's constant, T is the temperature, $\omega_0$ is the resonance frequency, M is the mass and Q is an empirical mechanical quality factor.

As can be seen, the noise floor of the vibration sensor 104 may be lowered by increasing the magnitude M of the mass 208. This lowering of the noise floor, however, is countered by another phenomenon: as the value of M increases, the value of the resonance frequency $\omega_0$ decreases. Since the resonance frequency $\omega_0$ is the upper limit of the operational frequency range of the vibration sensor 104, this means that increasing the mass M lowers the noise floor but decreases the operational frequency range of the sensor. Thus, the design of the vibration sensor 104, including the selection of the magnitude M of the mass 208, will depend on a trade-off between noise floor and frequency range. In the illustrated embodiment, the cantilever-based vibration sensor 104 is designed to have a relatively low operational frequency and low noise floor.

In the illustrated embodiment, the vibration sensor 104 includes a transducer 210 formed on the cantilever beam 204 to translate the vibrations of the cantilever beam 204 into output signals that can be processed and analyzed. The transducer 210 may generally be formed at a position on the cantilever beam 204 where it can sense the cantilever beam 204's vibrations with sufficient sensitivity, but where its mass does not significantly affect the cantilever beam 204's vibration.

In the embodiment shown, the transducer 210 is piezoelectric and comprises a piezoelectric material 212 such as aluminum nitride (AlN) sandwiched between a lower conductive layer 216 and an upper conductive layer 214. The lower conductive layer 216 is in contact with the cantilever beam 204. The upper conductive layer 214 and lower conductive layer 216 are coupled to the inputs of an amplifier 218, which outputs a voltage $V_{out}$ as a result of charges created in the upper and lower conductive layers 214 and 216, respectively, due to deformation of the piezoelectric material 212. In one embodiment, the amplifier 218 is a low-noise charge amplifier, but in other embodiments other types of amplifiers can be used. In other embodiments, the transducer 210 may be of another type, such as piezoresistive transducer or capacitive transducer.

The illustrated vibration sensor 104 is primarily a one-axis sensor, since it tends to vibrate primarily as shown by the arrow 220 and is thus most sensitive to vibrations along the z axis referenced in the figure. The vibration sensor 104, however, is capable of sensing vibrations along the y axis (into and out of the page), and thus could be used as a two-axis vibration sensor, although with less sensitivity along the y axis than along the z axis.

Figure 3:
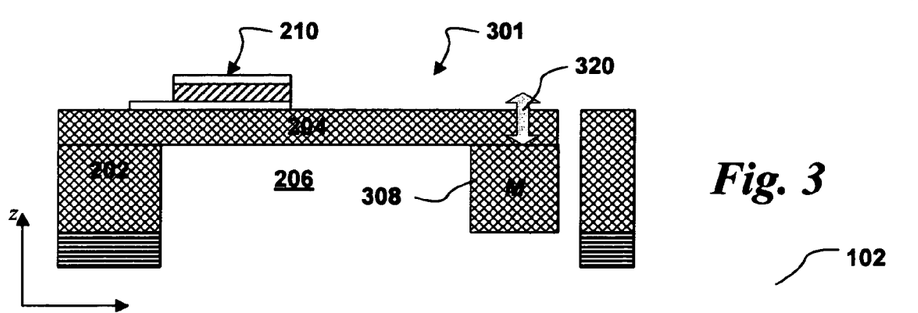
FIG. 3 is a cross-section view of a cantilever-based vibration sensor depicted in FIG. 2 according to an alternative embodiment of the present invention.

FIG. 3 illustrates an example of a low-frequency vibration sensor 301 implemented as a cantilever-based vibration sensor according to an alternative embodiment of the present invention. Like the vibration sensor 104 the vibrating element in the vibration sensor 301 is the cantilever beam 204 connected to the anchor 202, with the resulting air gap 206 under the cantilever beam 204. The air gap 206 permits the cantilever beam 204 to vibrate in the direction indicated by the arrows 320. The vibration sensor 301 also includes the transducer 210 and a mass 308 formed on the cantilever beam 204.

The primary differences between the vibration sensor 104 and the vibration sensor 301 are the method of manufacture and the placement of the mass 208. The vibration sensor 301 is built using bulk micromachining, so that the anchor 202, the cantilever beam 204 and the mass 308 are all formed from the substrate material. For example, in one embodiment where the substrate is a silicon-on-insulator (SOI) substrate including a layer of single crystal silicon on an insulating layer, the anchor 202, the cantilever beam 204 and the mass 308 can all be made of single crystal silicon. Because the vibration sensor 301 is built using bulk micromachining, the mass 308 can be formed on the bottom of the cantilever beam 204.

In one embodiment, the thickness of the cantilever beam 204, the

Figure 4:
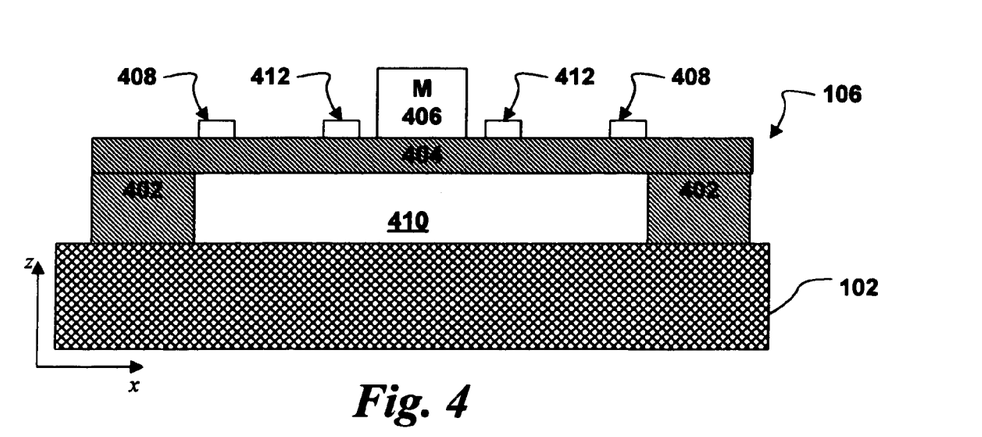
FIG. 4 is a cross-section view of a clamp-clamp beam or bridge beam-based vibration sensor that may be formed on the substrate depicted in FIG. 1 according to an embodiment of the present invention.

FIG. 4 illustrates an example of the medium-frequency vibration sensor 106 implemented as a clamp-clamp beam or bridge beam-based vibration sensor according to an embodiment of the present invention. In the illustrated embodiment, the vibration sensor 106 includes a bridge beam 404 supported by a pair of anchors 402.

In the illustrated embodiment, a mass 406 of magnitude M is formed on the bridge beam 404. The magnitude M of the mass 406 is determined taking into account the same factors mentioned above for the vibration sensor 104. In the embodiment shown, the mass 406 is positioned substantially at the mid-span of the beam 404, but in other embodiments the mass 406 could be moved closer to one of the anchors 402. In yet another embodiment, the mass 406 could also be placed on the lower side of the bridge beam 404, similarly to the placement of the mass 208 on the cantilever beam 204 in the vibration sensor 104.

In the illustrated embodiment, two pairs of transducers 408 and 412 are positioned on the bridge beam 404, with one pair positioned on either side of the mass 406. The transducers 408 are formed on the bridge beam 404 near the anchors 402 where the upper surface of the bridge beam 404 will be in tension when a force is applied to the bridge beam 404 in the z direction. The transducers 412 are formed on the bridge beam 404 closer to mid-span, where the upper surface of the bridge beam 404 will experience compression when a force is applied to the beam in the z direction.

In one embodiment, each of the transducers 408 and 412 can be a piezoelectric transducer. In other embodiments, the transducers 408 and 412 can be of another type, such as piezoresistive or capacitive, and both transducers 408 and 412 need not be of the same type. In still other embodiments, a greater or lesser number of transducers 408 and 412 can be used and transducers 408 and 412 can be placed at different or additional locations on the bridge beam 404.

As with the vibration sensor 104, the vibration sensor 106 may be surface micromachined such that the anchors 402 attach the bridge beam 404 to the substrate 102 and suspend the bridge beam 404 over the substrate 102. This creates an air gap 410 between the bridge beam 404 and the substrate 102 that permits the bridge beam 404 to vibrate in the direction indicated by the arrows.

In one embodiment the anchors 402 and the bridge beam 404 are made of the same material, such as polysilicon, silicon nitride (SiN), single crystal silicon, and the like. In other embodiments, however, the anchors 402 and bridge beam 404 need not be made of the same materials and can be made using materials besides those listed.

Figure 5:
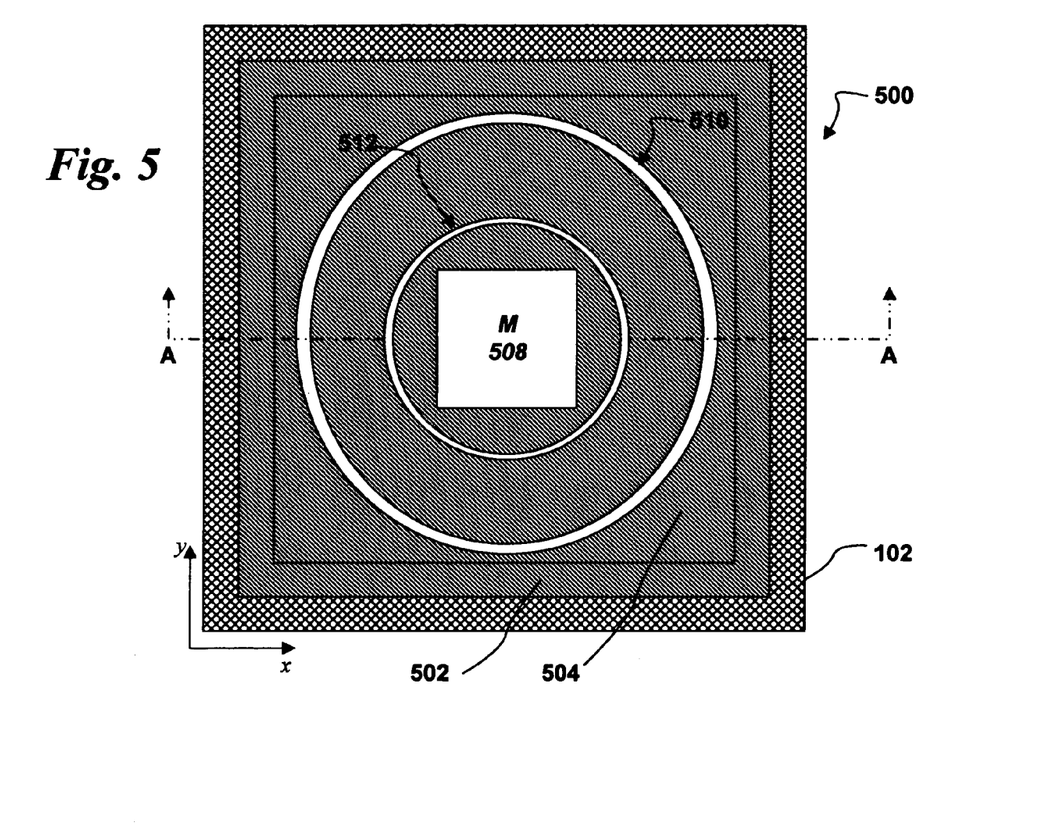
FIG. 5 is a top view of an annular diaphragm/membrane-based vibration sensor that may be formed on the substrate depicted in FIG. 1 according to an embodiment of the present invention.
Figure 6:
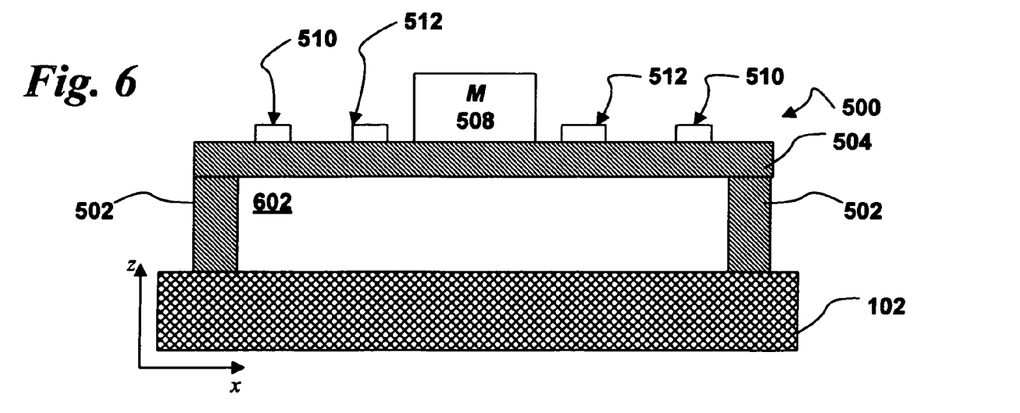
FIG. 6 is a cross-section view of an annular diaphragm/membrane-based vibration sensor depicted in FIG. 5 according to an embodiment of the present invention.

FIGS. 5 and 6 illustrate an example of the high-frequency vibration sensor 108 implemented as an annular diaphragm/membrane-based vibration sensor according to an embodiment of the present invention. In the illustrated embodiment, the vibrating element is an annular diaphragm/membrane 504 supported around its perimeter by an anchor 502. The illustrated vibration sensor 108 is surface micromachined such that the anchor 502 attaches the annular diaphragm/membrane 504 to the substrate 102 and suspends the annular diaphragm/membrane 504 over the substrate 102 creating an air gap 602 between the annular diaphragm/membrane 504 and the substrate 102. The air gap 602 permits the annular diaphragm/membrane 504 to vibrate.

In the embodiment shown, a mass 508 of magnitude M is formed on the annular diaphragm/membrane 504, and the magnitude M of the mass 508 is determined taking into account the same factors mentioned above for the vibration sensor 104. Also, the mass 508 is positioned substantially at the center of the annular diaphragm/membrane 504, but in other embodiments the mass 508 could be moved to a different location on the annular diaphragm/membrane 504. In another embodiment, the mass 508 could be placed on the lower side of the annular diaphragm/membrane 504, similar to the placement of the mass 308 on the cantilever beam 304 in the vibration sensor 301.

In the illustrated embodiment, a pair of transducer rings 510 and 512 is positioned on the annular diaphragm/membrane 504 surrounding the mass 508. The transducer ring 510 is formed on the annular diaphragm/membrane 504 near the anchor 502 where the upper surface of the annular diaphragm/membrane 504 will be in tension when a force is applied to the annular diaphragm/membrane 504 in the z direction. The transducer ring 512 is formed on the annular diaphragm/membrane 504 closer to the mass 508 where the upper surface of the annular diaphragm/membrane 504 will experience compression when a force is applied to the annular diaphragm/membrane 504 in the z direction.

In one embodiment, the transducers 510 and 512 can be piezoelectric transducers 310. In other embodiments, the transducers 510 and 512 may be of another type, such as piezoresistive or capacitive, and need not be of the same type. Additionally, the embodiment shown uses transducers 510 and 512 on the top of the annular diaphragm/membrane 504, but in other embodiments the transducers 510 and 512 could be placed on the bottom of the annular diaphragm/membrane 504, or could be replaced with one or more transducers at various locations on the annular diaphragm/membrane 504.

In one embodiment, the anchor 502 and the annular diaphragm/membrane 504 are a single unit made of the same material, such as polysilicon, silicon nitride (SiN), single crystal silicon, and the like. In other embodiments, however, the anchor 502 and annular diaphragm/membrane 504 can be separate units made of the same material or separate units made of different materials, and the materials can be materials besides those listed FIGS. 7 and 8 together illustrate yet another example of a MEMS vibration sensor 700 that can be formed on the substrate 102 of the vibration sensor array 100 along with another type of vibration sensor according to an embodiment of the present invention. The vibration sensor 700 is a three-axis vibration sensor that includes a substantially rectangular anchor 702 from which a vibrating element is suspended. The vibrating element comprises four suspension elements 706, one attached to each side of the anchor 702, and a center coupling 712 to which the suspension elements 706 are attached. A mass 704 of magnitude M is suspended from the center coupling 712.

Figure 7:
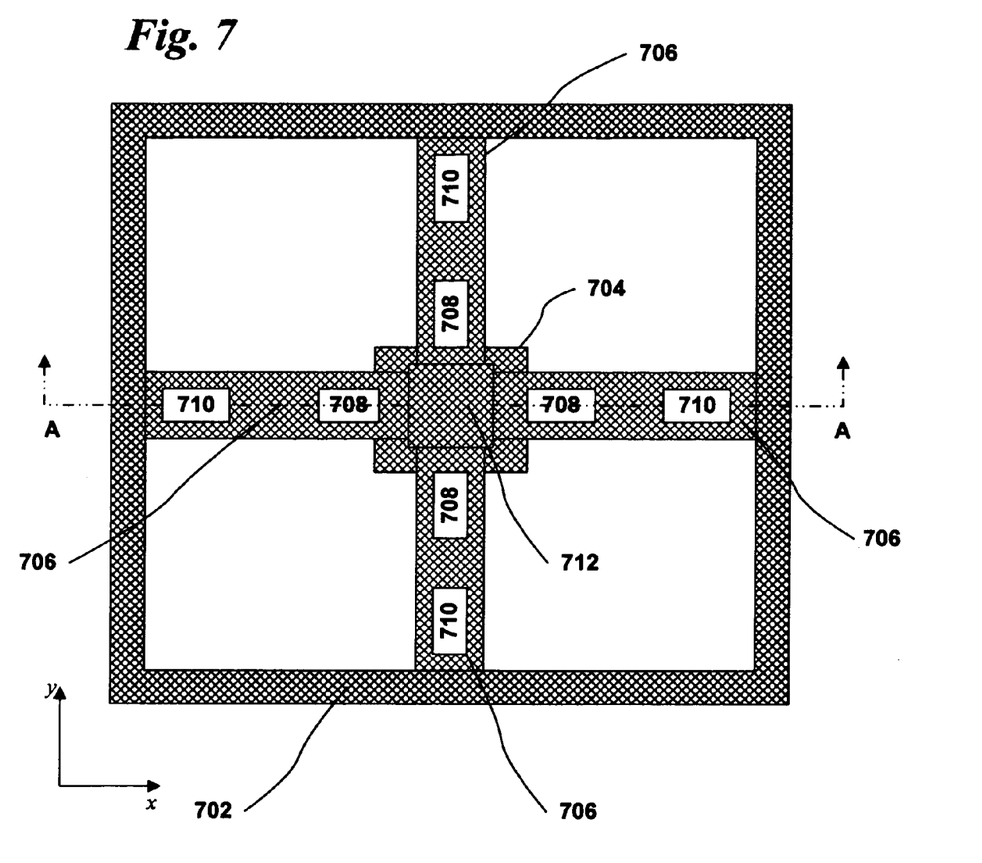
FIG. 7 is a top view of a suspension-based vibration sensor that may be formed on the substrate depicted in FIG. 1 according to an embodiment of the present invention.
Figure 8:
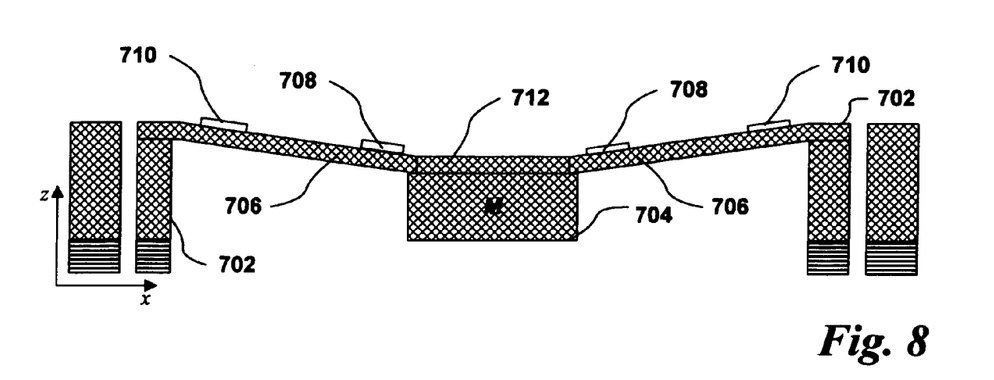
FIG. 8 is a cross-section view of the suspension-based vibration sensor depicted in FIG. 7 according to an embodiment of the present invention.

In the illustrated embodiment, four pairs of transducers 708 and 710 are formed on each suspension member 706. The transducers 710 are formed on the suspension members 706 near the anchor 702, where the upper surfaces of the suspension members will be in tension when a force is applied to the center coupling 712 in the z direction. The transducers 708 are formed on the suspension members 706 closer to the center coupling 712, where the upper surfaces of the suspension members 706 will experience compression when a force is applied to the center coupling 712 in the z direction.

As with the other vibration sensors discussed above, more or less transducers could be used and could be positioned differently than shown. The particular construction of the vibration sensor 700 and placement of transducers 708 on each suspension element 706 allow the vibration sensor 700 to detect vibrations along all three of the x, y and z axes, although the z axis is likely to be its axis of greatest sensitivity.

The illustrated vibration sensor 700 may be made by bulk micromachining, such that the four suspension elements 706, the center coupling 712 and the mass 704 may all made of the same material of which the substrate is made. For example, in one embodiment where the substrate is a silicon-on-insulator (SOI) substrate including a layer of single crystal silicon on an insulating layer, the four suspension elements 706, the center coupling 712 and the mass 704 can all be made of single crystal silicon.

Because each of the vibration sensors described in the present application is of a different type, each of the vibration sensors 104, 106 and 108 may a noise floor different from the others as well as an operational frequency range different from the others while still being formed on the same substrate. In one embodiment, the vibration sensor with the lowest noise floor also has the lowest operational frequency range, while the vibration sensor with the highest noise floor has the highest operational frequency range. Also, in one embodiment the vibration sensors 104, 106, 108 have different noise floors but overlapping operational frequency ranges. With this combination of sensors being of different types, but substantially the same sizes, thus having different noise floors and different operational frequency ranges, the vibration sensor array 100 can be used to accurately detect vibrations over a wide spectrum of frequencies and intensities.

In one embodiment of the array 100, in any given vibration sensor array 100, the individual vibration sensors 104, 106 and 108 do not have the same construction or the same number of axes. Instead, the vibration sensor array 100 can consist of combinations of one-axis, two-axis or three-axis vibration sensors. The array can also consist of combinations of subsets of these—in other words, the array can include only one- and two-axis vibration sensors, only one- and three-axis sensors, or only two- and three-axis sensors.

In some applications, two- or three-axis vibration sensing may be required, but two- or three-axis vibration sensors are not sufficiently sensitive in all directions. A three-axis vibration sensor, for example, may be very sensitive in one direction but much less sensitive in the other two directions. In cases where high sensitivity is required in all directions, the vibration sensors 104, 106 and 108 can, in one embodiment, all be one-axis vibration sensors with their axis aligned in different directions, for example one with its axis in the x direction, one with its axis in the y direction and one with its axis in the z direction. In another embodiment, the vibration sensors 104, 106 and 108 can also comprise multi-axis vibration sensors with their axes of greatest sensitivity aligned in different directions.

For some embodiments, the thicknesses of the cantilever beam 204, the bridge beam 404, annular diaphragm/membrane 504, and the suspension element 706 are the same. For example, the cantilever beam 204 may have a thickness of approximately ten micrometers (10 μm), the bridge beam 404 may have a thickness of approximately ten micrometers (10 μm), the annular diaphragm/membrane 504 may have a thickness of approximately ten micrometers (10 μm), and the suspension element 706 may have a thickness of approximately ten micrometers (10 μm).

For some embodiments, the magnitudes of the mass 208, the mass 308, the mass 406, 508, and the mass 704 are the same. For example, the magnitude of the mass 208 may be two milligrams (2 mg), the mass 308 may be two milligrams (2 mg), the mass 406 may be two milligrams (2 mg), the mass 508 may be two milligrams (2 mg), and the mass 704 may be two milligrams (2 mg). Of course, the magnitude of each mass need not be the same.

In operation, the vibration sensor array 100 is attached to a device whose vibration is to be measured. The vibration sensors 104, 106 and 108 in the array have a range of noise floors, a wide operational frequency range and, in some embodiments, the ability to sense vibration in more than one direction. With this combination of features, at least one of the sensors will be able to accurately sense the particular intensity and frequency of vibration of the device to which the sensor array 100 is attached. The outputs of the one or more vibration sensors 104, 106 and 108 that measure the vibration of the device are then routed to the proper equipment for conditioning and processing.

Figure 9:
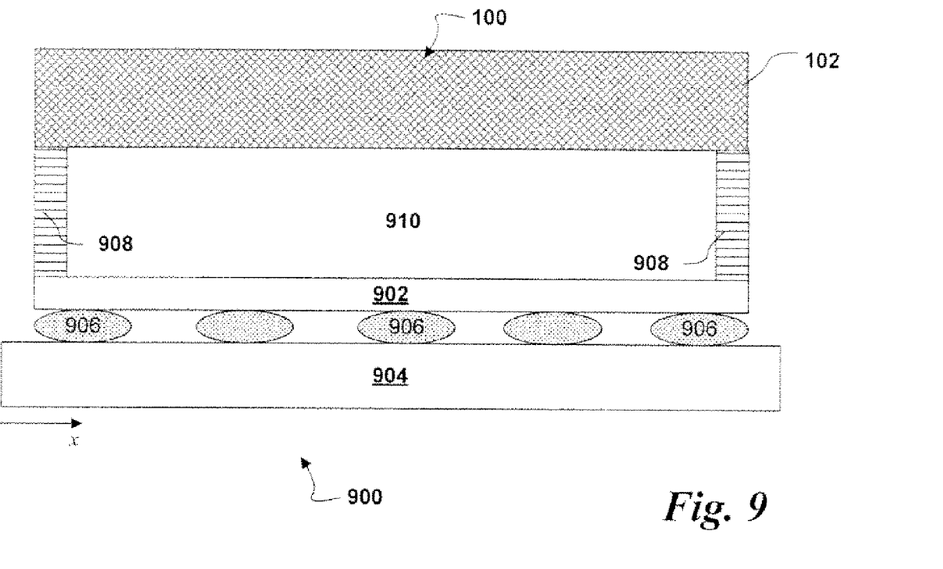
FIG. 9 illustrates an embodiment of an electronic package having the sensor array depicted in FIG. 1 according to an embodiment of the present invention.

FIG. 9 illustrates an embodiment of an electronic package 900 including a sensor array 100. In the package 900, the vibration sensor array 100 is flipped upside down and mounted to a device 902 by supports 908. In one embodiment, the device 902 is a low-noise electronic chip, but in other embodiments the device 902 can be something different. The device 902 is flip-chip mounted to a printed circuit board 904 using several solder balls 906.

In the illustrated embodiment, the supports 908 attach the vibration sensor array 100 to the device 902. In one embodiment, the supports 908 may create a sealed cavity 910 between the vibration sensor array 100 and the device 902, such that any air in the sealed cavity 910 can be vacuumed out. The creation of a vacuum in the cavity 910 substantially increases the value of Q in the equation discussed above in connection with FIG. 3, and thus significantly lowers the noise floors of the individual vibration sensors 104, 106 and 108 on the sensor array 100.

Figure 10:
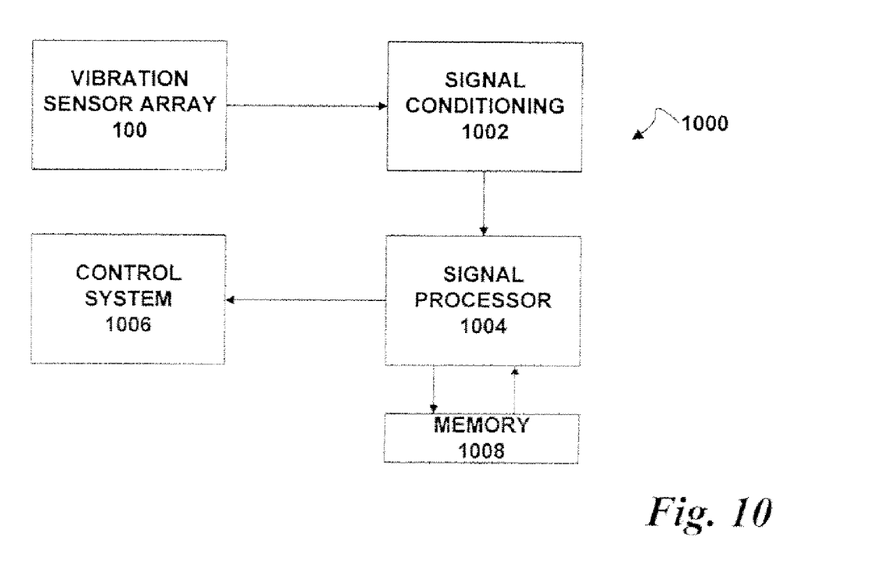
FIG. 10 illustrates an embodiment of a system for processing signals from the sensor array depicted in FIG. 1 according to an embodiment of the present invention.

FIG. 10 illustrates an embodiment of a system 1000 including a sensor array such as the sensor array 100. In the illustrated embodiment, the sensor array 100 is coupled to a signal conditioning unit 1002.

In one embodiment, the signal conditioning unit can include elements such as amplifiers, analog-to-digital converters, and the like that condition the raw signals received from each of the vibration sensors 104, 106 and 108 within the vibration sensor array 100. The signal conditioning unit 1002 is coupled to a signal processor 1004, whose output is coupled to a control system 1006. The signal processor 1004 also is coupled to a memory 1008.

In one embodiment, the signal conditioning unit 1002 can include elements such as amplifiers, analog-to-digital converters, and the like that condition the raw signals received from each of the vibration sensors 104, 106 and 108 within the vibration sensor array 100. The signal processor 1004 in one embodiment may be a digital signal processor.

The control system 1006 may direct the motion of the device to which the vibration sensor 100 is attached. In one embodiment, the control system 1006 may be a cutoff mechanism that simply shuts down operation of the device to which the sensor array 100 is attached if the sensor array 100 detects excessive vibration, vibration at an unexpected frequency, and/or other predetermined condition. In other embodiments, more sophisticated control systems can be used to alter the operation of the device to which the sensor array 100 is attached, providing closed-loop control of the device's intensity and frequency of vibration.

In one embodiment, the memory 1008 can be a volatile memory such as static random access memory (SRAM). In other embodiments, the memory 1008 may be dynamic random access memory (DRAM). Other types of volatile or non-volatile memory also may be used in other embodiments.

Figure 11:
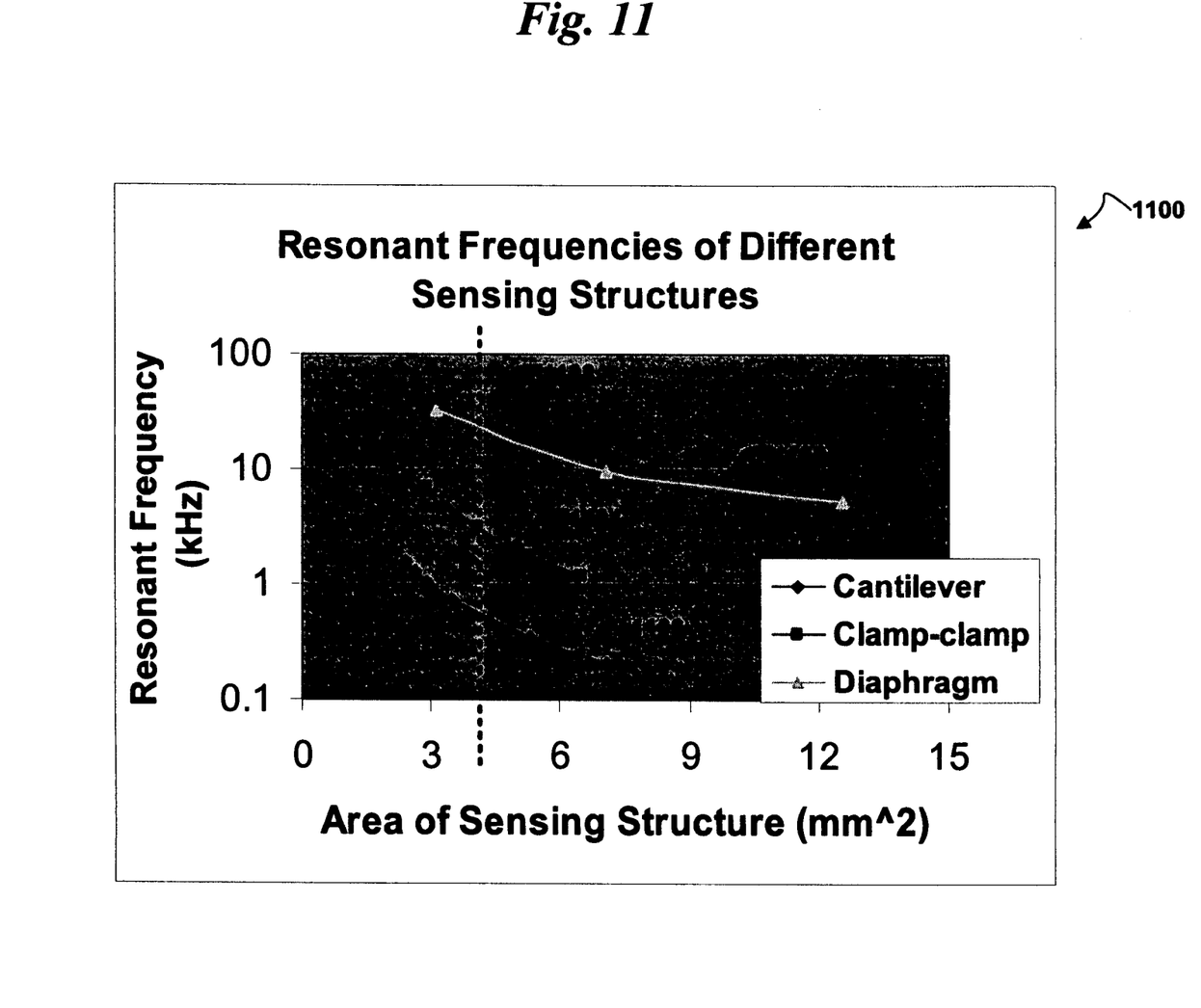
FIG. 11 is a graphical representation illustrating a relationship between resonant frequencies and size for different sensing structures formed on the substrate depicted in FIG. 1 according to an embodiment of the present invention.

FIG. 11 is a graphical representation 1100 illustrating resonant frequencies of different sensing structures formed on the substrate 102 according to an embodiment of the present invention. The graphical representation shows a comparison of the performance of a vibration sensor array having a cantilever-based vibration sensor, a clamp-clamp beam-based vibration sensor, and an annular diaphragm-based vibration sensor.

In the illustrated embodiment, a curve 1102 represents the relationship of the size of the vibration sensor to the resonant frequency of the annular diaphragm-based vibration sensor. A curve 1104 represents the relationship of the size of the vibration sensor to the resonant frequency of the clam-clamp bridge-based vibration sensor. A curve 1106 represents the relationship of the size of the vibration sensor to the resonant frequency of the cantilever-based vibration sensor.

As the graphical representation 1100 illustrates, simulated results show that even if the vibration sensors have the same size, the vibration sensor array may still be able to properly sense a wide range of frequencies. For example, a line 1108 indicates that when the size of the cantilever-based vibration sensor, the clamp-clamp beam-based vibration sensor, and the annular diaphragm-based vibration sensor are each approximately four millimeters square (4 mm$^2$), the cantilever-based vibration sensor has a resonant frequency of approximately forty kilohertz (40 kHz), the clamp-clamp beam-based vibration sensor has a resonant frequency of approximately five kilohertz (5 kHz), and the annular diaphragm-based vibration sensor has a resonant frequency of approximately eight hundred hertz (800 Hz).

Throughout this patent application, reference to one or more components being formed "on" a substrate is intended to include components formed using one or the other, or both, of surface micromachining and bulk micromachining. Although the sensor array 100 has all its vibration sensors 104, 106 and 108 on the same side of the substrate, in other embodiments one or more of the sensors 104, 106 and 108 could also be formed on different sides of the substrate 102. Moreover, although three vibration sensors are shown, in other embodiments a lesser or greater number of vibration sensors could be formed on the substrate 102.

Embodiments of the present invention may be implemented using hardware, software, or a combination thereof. In implementations using software, the software or machine-readable data may be stored on a machine-accessible medium. The machine-readable data may be used to cause a machine, such as, for example, a processor (not shown) to perform the processes 200 and 400. A machine-readable medium includes any mechanism that may be adapted to store and/or transmit information in a form accessible by a machine (e.g., a computer, network device, personal digital assistant, manufacturing tool, any device with a set of one or more processors, etc.). For example, a machine-readable medium includes recordable and non-recordable media (e.g., read only (ROM), random access (RAM), magnetic disk storage media, optical storage media, flash devices, etc.), such as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
    a substrate;
    a first vibration sensor formed on the substrate to sense an intensity and frequency of vibration of a device to which the substrate is attached, wherein the first vibration sensor includes a first vibration element to vibrate in response to a vibration of the device to which the substrate is attached, wherein the device is an electronic chip; and
    a second vibration sensor formed on the substrate, wherein the second vibration sensor includes a second vibration element to vibrate in response to the vibration of the device to which the substrate is attached,
    wherein the first vibration element is a first type and the second vibration element is a second type, wherein the first vibration element type is different from the second vibration element type, and wherein the first vibration element type is a cantilever beam and the second vibration element type is an annular diaphragm.

2. The apparatus of claim 1, further comprising a first and/or a second mass attached to the cantilever beam and/or the annular diaphragm, respectively.

3. The apparatus of claim 1, further comprising a first transducer and a second transducer formed on the first and second vibrating elements, respectively, to convert vibrations from the first and the second vibrating elements into first and second electrical signals, respectively.

4. The apparatus of claim 1, wherein the substrate, the first vibration sensor, and the second vibration sensor comprise a microelectromechanical system (MEMS).

5. The apparatus of claim 1, wherein a thickness of the first vibration sensor is substantially the same as a thickness of the second vibration sensor and/or wherein a magnitude of a first mass attached to the first vibration sensor is substantially the same as a second magnitude of a second mass attached to the second vibration sensor.

6. A method, comprising:
    sensing a first intensity and a first frequency of vibration of a device to which a substrate is coupled using a first vibration sensor formed on the substrate, wherein the first vibration sensor includes a cantilever beam as a first vibration element of a first type, the first vibration sensor vibrating in response to a vibration of the device to which the substrate is coupled, wherein the device is an electronic chip; and
    sensing at least a second intensity and at least a second frequency of vibration of a device to which a substrate is coupled using at least a second vibration sensor formed on the substrate, wherein the second vibration sensor includes an annular diaphragm as a second vibration element of a second type different from the first type of vibration element, the second vibration sensor vibrating in response to the vibration of the device to which the substrate is coupled.

7. The method of claim 6, further comprising conditioning output signals from the first and the second vibration sensors.

8. The method of claim 7, further comprising directing motion of the device based on the conditioned output signals.

9. A system, comprising:
    a vibration sensor away having a first vibration sensor formed on the substrate to sense an intensity and frequency of vibration of a device to which the substrate is attached, wherein the first vibration sensor includes a first vibration element of a first type to vibrate in response to a vibration of the device to which the substrate is attached, wherein the device is an electronic chip, and a second vibration sensor formed on the substrate, wherein the second vibration sensor includes a second vibration element of a second type different from the first vibration element type to vibrate in response to the vibration of the device to which the substrate is attached, and wherein the first vibration element type is a cantilever beam and the second vibration element type is an annular diaphragm; and
    a dynamic random access memory (DRAM) to store outputs of the first and the second vibration sensors.

10. The system of claim 9, further comprising circuitry to condition the output signals from the first and the second vibration sensors.

11. The system of claim 9, further comprising circuitry to convert the output signals from the first and the second vibration sensors from analog signals to digital signals.

* * * * *